(12) United States Patent
Chen

(10) Patent No.: US 6,738,130 B1
(45) Date of Patent: May 18, 2004

(54) ULTRA-LIGHT HELMET-MOUNTED LASER RANGE FINDER

(75) Inventor: Chungte W. Chen, Irvine, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/390,449

(22) Filed: Mar. 17, 2003

(51) Int. Cl.[7] ................................................. G01C 3/08
(52) U.S. Cl. ...................... 356/4.01; 356/5.01; 356/5.1; 359/19
(58) Field of Search .................... 356/4.01, 5.01, 356/5.1; 359/19

(56) References Cited

U.S. PATENT DOCUMENTS 4,072,395 A * 2/1978 Mohon
4,687,282 A * 8/1987 Ferrante
5,009,502 A * 4/1991 Shih et al.
6,608,708 B1 * 8/2003 Amadon et al.

* cited by examiner

Primary Examiner—Stephen C. Buczinski
(74) Attorney, Agent, or Firm—John E. Gunther; Leonard A. Alkov; Glenn H. Lenzen, Jr.

(57) ABSTRACT

A holographic telescope (40). The novel invention is comprised of an eyepiece (44) and a first holographic optical element (42) positioned to receive incident electromagnetic energy and focus the energy on the eyepiece (44). In the preferred embodiment, the eyepiece (44) is a second holographic optical element, and both holographic optical elements are volume holograms. Each holographic optical element can be transmissive or reflective depending on packaging needs. The holographic telescope (40) can be multi-spectral by including multiple independent holograms in each holographic optical element, each hologram responding only to a particular wavelength.

12 Claims, 3 Drawing Sheets

ULTRA-LIGHT HELMET-MOUNTED LASER RANGE FINDER

BACKGROUND OF THE INVENTION

1. Field of the Invention

The present invention relates to optical systems. More specifically, the present invention relates to lightweight telescopes for helmet-mounted laser range finders.

2. Description of the Related Art

The next generation laser range finder (LRF) for the $21^{st}$ century land warrior will be helmet-mounted such that the soldier can have both hands free for other mission critical tasks. A helmet-mounted laser range finder must be very lightweight and have a very low center of gravity. Otherwise, it would be very uncomfortable and unsafe to wear. Soldiers could easily break their necks during any accident.

The current hand-held LRF for soldier applications weighs about 1 lb, which is too heavy to be mounted on a helmet. A significant reduction in weight is required for helmet-mounted LRF applications. Additionally, the current LRF is expensive due to the required precision optical components.

A large contributor to the weight of the LRF is the telescope. Laser range finders require a telescope to transmit the out-going laser beam and collect the return signal. Conventional telescopes are based on refractive means such as lenses and mirrors. The optical power of a lens or mirror is proportional to its curvature, and requires a certain thickness to accommodate the curved surfaces. A refractive telescope is therefore very heavy in nature and unsuitable for the helmet-mounted LRF application.

Typical prior helmet-mounted displays (HMD) employed plastic lenses in an attempt to reduce the weight. A LRF with plastic lenses, however, would still be too heavy to be mounted on a helmet. Furthermore, the index of refraction of a plastic lens is very-sensitive to temperature and humidity changes. For HMD applications, any defocus due to index changes of the plastic lenses can generally be tolerated as long as it is within the human eye accommodation range. For LFR applications, however, any defocus error of the optics will introduce a beam divergence error. Consequently, the range of the LRF would be greatly reduced.

Hence, a need exists in the art for a compact, lightweight telescope suitable for helmet-mounted laser range finder applications.

SUMMARY OF THE INVENTION

The need in the art is addressed by the holographic telescope of the present invention. The novel invention is comprised of an eyepiece and a first holographic optical clement positioned to receive incident electromagnetic energy and focus the energy on the eyepiece. In the preferred embodiment, the eyepiece is a second holographic optical element, and both holographic optical elements are volume holograms. Each holographic optical element can be transmissive or reflective depending on packaging needs. The holographic telescope can be multi-spectral by including multiple independent holograms in each holographic optical element, each hologram responding only to a particular wavelength.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
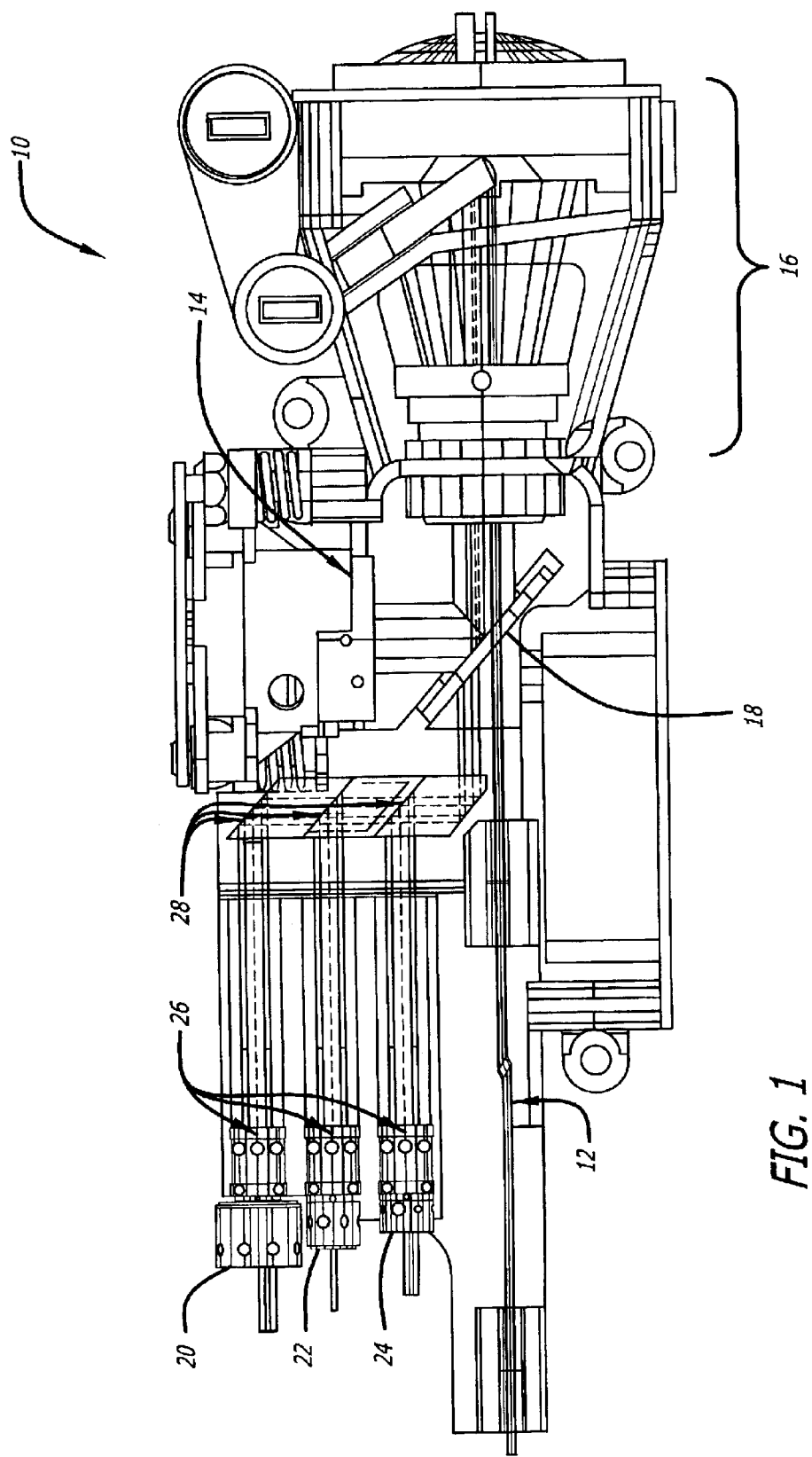
FIG. 1 is a diagram of a conventional laser range finder.

FIG. 1 is a diagram of a conventional laser range finder 10 comprised of a laser transmitter 12, a receiver 14, and a telescope 16. A beam splitter 18 transmits the laser beam from the transmitter 12 to the telescope 16, and reflects a return signal received by the telescope 16 to the receiver 14. The telescope 16 expands the transmitting beam to reduce the beam divergence of the out-going laser beam. The telescope 16 also increases the aperture to collect the return signal. The LRF 10 of FIG. 1 also includes three additional lasers (20, 22, 24) for different functions such as visible light aiming, imaging intensifier aiming, and combat identification. Alignment wedges 26 and multi-layer dielectric coating bean splitters 28 co-align and combine the beams from these three lasers (20, 22, 24) and direct them to the telescope 16.

Figure 2:
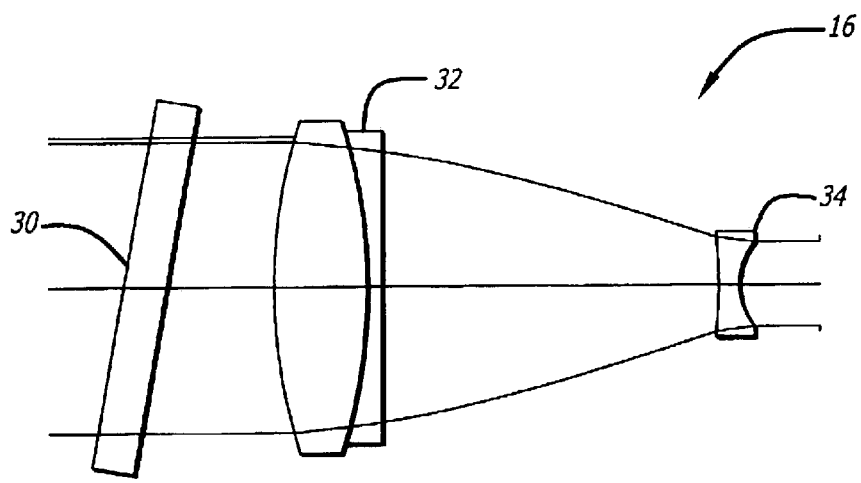
FIG. 2 is an optical schematic of a conventional telescope for laser range finder applications.

FIG. 2 is an optical schematic of a conventional telescope 16 for laser range finder applications. The conventional LRF telescope 16 includes a window 30, an objective lens 32, and an eyepiece 34. The objective lens 32 collects incident energy which is focused in front of the eyepiece 34 and re-collimated by the eyepiece 34.

As discussed above, the optics for a conventional telescope are based on refractive means such as lenses and mirrors. Telescopes for LRF applications need to have the highest optical power and largest collecting area possible. The optical power of a lens or mirror is proportional to its curvature, and requires a certain thickness to accommodate the curved surfaces. A refractive telescope is therefore very heavy in nature.

The lightweight telescope of the present invention uses holographic optical elements (HOE) instead of conventional lenses and mirrors. Holographic optical elements are highly wavelength sensitive and therefore unsuitable for most wideband telescope applications. They are the ideal optical elements, however, for LRF applications since the light source of a LRF is monochromatic. Because the optical power of a HOE is based on the diffraction effect, it is very light in weight, and the diffraction efficiency of a volume hologram is theoretically 100%. Additionally, holographic optical elements can be easily replicated, making them very inexpensive.

Figure 3:
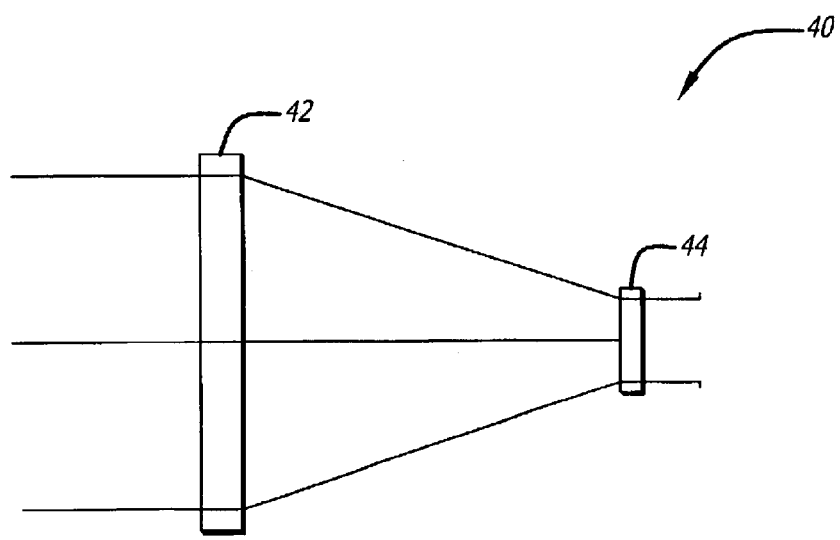
FIG. 3 is an optical schematic of a holographic telescope designed in accordance with the teachings of the present invention.

FIG. 3 is an optical schematic of a holographic telescope 40 designed in accordance with the teachings of the present invention. In the illustrative embodiment, the novel telescope 40 includes a holographic objective/window 42 and a holographic eyepiece 44. The holographic objective/window 42 receives incident energy and focuses it on the holographic eyepiece 44. The glass objective lens and eyepiece of the conventional telescope of FIG. 2 are thus replaced with two holographic optical elements. In the preferred embodiment, the two holographic optical elements are volume holograms. The phase descriptions $f_o(r)$ and $f_e(r)$ of the objective and eyepiece holographic optical elements, respectively, shown in the illustrative embodiment of FIG. 3 are:

$$f_o(r)=0.211298E+00*r^2$$

$$f_e(r)=-0.807347E+00*r^2$$

Here r is the radius from the center of the holographic optical element. The laser in the illustrative embodiment is operating at a wavelength of 1533 nm. The positive coefficient for $f_o(r)$ means the holographic optical element has positive optical power to focus the laser beam, and the negative coefficient for $f_e(r)$ implies the holographic optical element will have negative optical power. Other holographic optical element designs may be used without departing from the scope of the present teachings. Holographic optical elements are well known in the art, and one of ordinary skill in the art will be able to design and fabricate holographic optical elements suitable for use in this invention.

The optical power of a HOE is based on the diffraction means. The ray bending takes place on a plane instead of a curved surface. Therefore, it can be very light and compact. The diffraction efficiency of a volume hologram is theoretically 100% and is highly wavelength sensitive. This invention is based on this unique property associated with a volume hologram to simplify the helmet-mounted LRF optics. More importantly, the overall optics weight can be reduced to 20% of a conventional LRF. The holographic objective lens and the window can also be physically combined as one single piece.

The holographic telescope can also be multi-spectral by encoding two or more holograms on the same layer of emulsion. Since a volume hologram such as dichromated gelatin or photo-polymer is highly selective in wavelength, several holograms can be recorded on the same layer of emulsion. Each hologram only responds to a particular wavelength. The telescope can therefore be used for both the ranging beam and the aiming beams.

A holographic telescope implemented in accordance with the teachings of the present invention may be expected to be relatively inexpensive due to the replicable nature of the hologram. That is, after the master hologram is made, it is very easy to duplicate. Furthermore, since the substrate is flat, it simplifies opto-mechanical structure and alignment processes.

Figure 4A:
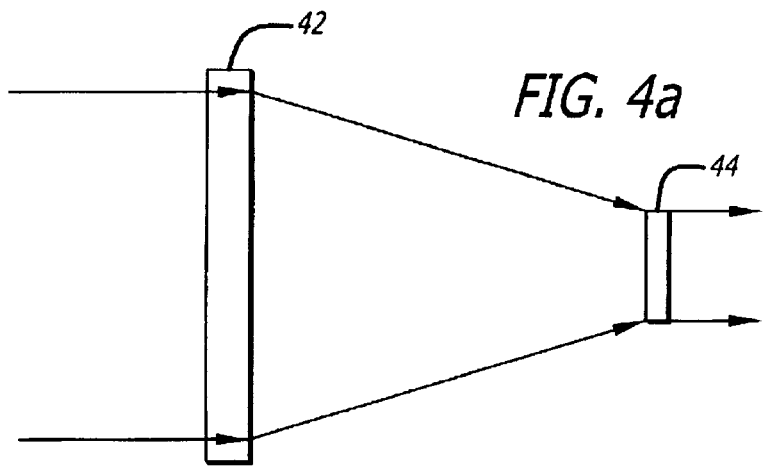
FIG. 4a is an optical schematic of an on-axis holographic telescope designed in accordance with the teachings of the present invention.
Figure 4B:
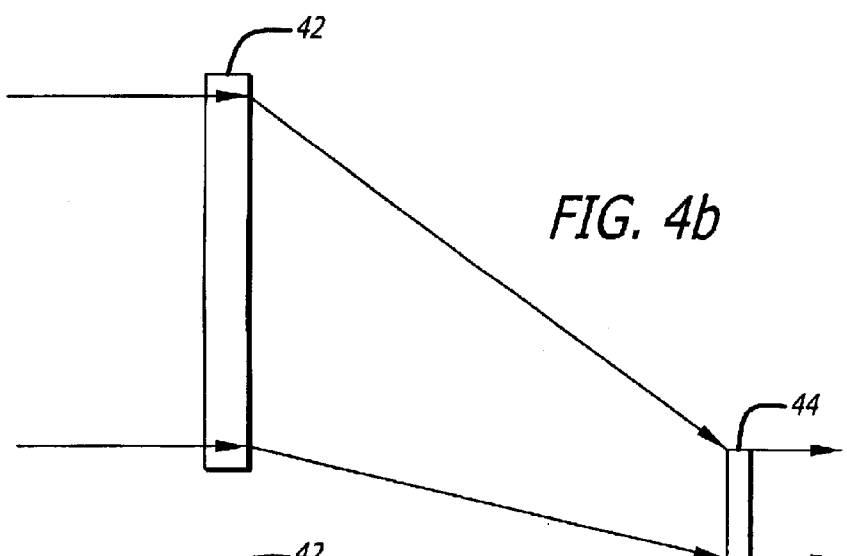
FIG. 4b is an optical schematic of an off-axis holographic telescope designed in accordance with the teachings of the present invention.
Figure 4C:
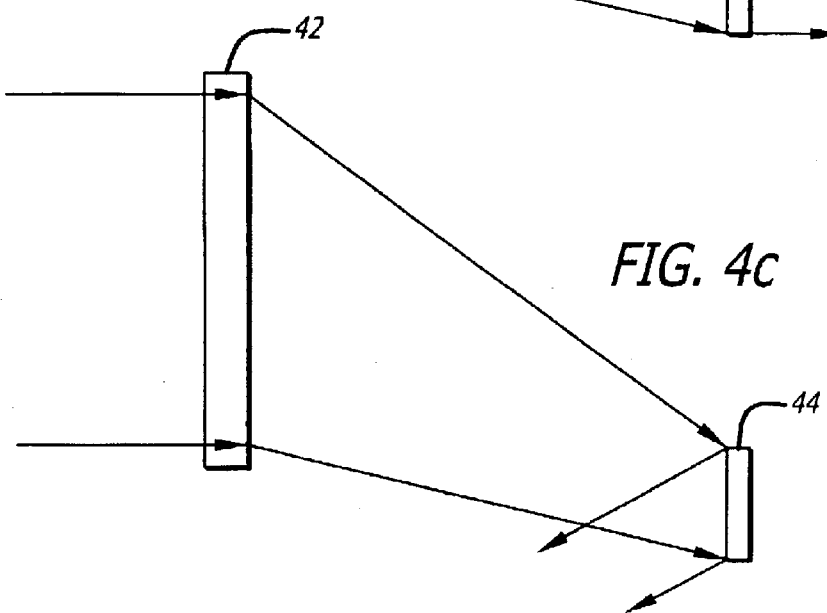
FIG. 4c is an optical schematic of a hybrid design holographic telescope designed in accordance with the teachings of the present invention.

FIGS. 4a–4c are optical schematics of various implementations of a holographic telescope designed in accordance with the teachings of the present invention. FIG. 4a shows a design for an on-axis holographic telescope, where the optical axes of the holographic objective 42 and eyepiece 44 are centered with respect to the optical axis of the beam. Since a volume HOE requires a certain carrier frequency (off-axis) to have 100% theoretical diffraction efficiency, each HOE in FIG. 4a consists of 2 off-axis HOEs, but the total optical power is equivalent to an on-axis HOE. FIG. 4b shows a design for an off-axis holographic telescope, where the optical axes of the holographic objective 42 and eyepiece 44 are decentered with respect to the optical axis of the beam. FIG. 4c shows a hybrid design, where the objective lens 42 is an off-axis transmissive HOE and the eyepiece 44 is a reflective HOE. The objective lens 42 and the eyepiece 44 can be either transmissive or reflective HOEs, depending on the packaging needs of the application. These are three illustrative embodiments of the holographic telescope of the present invention. Other implementations may be used without departing from the scope of the invention.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser range finder comprising:
   a laser transmitter disposed within said ranges finder;
   a receiver disposed within said range finder; and
   a telescope disposed within said range finder, said telescope comprising
      an eyepiece and;
      a first holographic optical element positioned to receive a return signal and focus said signal on said eyepiece.

2. The invention of claim 1 wherein said eyepiece is a second holographic optical element.

3. The invention of claim 1 wherein said first holographic optical element is a volume hologram.

4. The invention of claim 1 wherein said first holographic optical element is transmissive.

5. The invention of claim 1 wherein said first holographic optical element is reflective.

6. The invention of claim 2 wherein said second holographic optical element is a volume hologram.

7. The invention of claim 2 wherein said second holographic optical element is transmissive.

8. The invention of claim 2 wherein said second holographic optical element is reflective.

9. The invention of claim 1 wherein said first holographic optical element includes two or more independent holograms, wherein each hologram is responsive to a particular narrowband radiation.

10. The invention of claim 2 wherein said second holographic optical element includes two or more independent holograms, wherein each hologram is responsive to a particular narrowband radiation.

11. The invention of claim 1 wherein said laser range finder further includes one or more additional laser transmitters.

12. The invention of claim 11 wherein said first holographic optical element includes two or more independent holograms, wherein each hologram is responsive to a particular narrowband radiation.

* * * * *